United States Patent [19]

Misawa et al.

[11] Patent Number: 5,336,569
[45] Date of Patent: Aug. 9, 1994

[54] POWER GENERATING EQUIPMENT

[75] Inventors: Hidenobu Misawa, Toyoake; Shoji Seike, Nagoya, both of Japan

[73] Assignee: NGK Insulators, Ltd., Japan

[21] Appl. No.: 852,540

[22] Filed: Mar. 17, 1992

[30] Foreign Application Priority Data

Mar. 20, 1991 [JP] Japan ................. 3-080634
Mar. 20, 1991 [JP] Japan ................. 3-080635
Mar. 22, 1991 [JP] Japan ................. 3-081221

[51] Int. Cl.$^5$ ............................. H01M 8/10
[52] U.S. Cl. ............................. 429/31; 429/32
[58] Field of Search .................... 429/30-32

[56] References Cited

U.S. PATENT DOCUMENTS

| 4,808,491 | 2/1989 | Reichner ............... 429/30 X |
| 4,833,045 | 5/1989 | Pollack et al. .......... 429/31 X |
| 4,874,678 | 10/1989 | Reichner ............... 429/31 X |
| 4,983,471 | 1/1991 | Reichner et al. . |
| 5,079,105 | 1/1992 | Bossel ................. 429/32 X |

FOREIGN PATENT DOCUMENTS

| 0181680 | 5/1986 | European Pat. Off. . |
| 0242200 | 10/1987 | European Pat. Off. . |
| 0264688 | 4/1988 | European Pat. Off. . |
| 0410796 | 1/1991 | European Pat. Off. . |
| 3004454 | 1/1991 | Japan . |
| 3008266 | 1/1991 | Japan . |

*Primary Examiner*—Stephen Kalafut
*Attorney, Agent, or Firm*—Parkhurst, Wendel & Rossi

[57] ABSTRACT

A power generating device in which a plurality of cylindrical solid oxide fuel cell elements are electrically connected to each other to constitute a collecting cell which is provided in a power generating chamber. The device is arranged such that a fuel gas is supplied on the surface of each solid oxide fuel cell element in the power generating chamber in an evenly distributed manner in order to reduce a temperature gradient due to a fuel concentration gradient in the chamber. Cracks are prevented in the solid oxide, unevenness of an electrochemical reaction in the power generating chamber becomes small, and the power generating efficiency is improved.

87 Claims, 10 Drawing Sheets

FIG_2

FIG_3

FIG_4

FIG_6

FIG_7

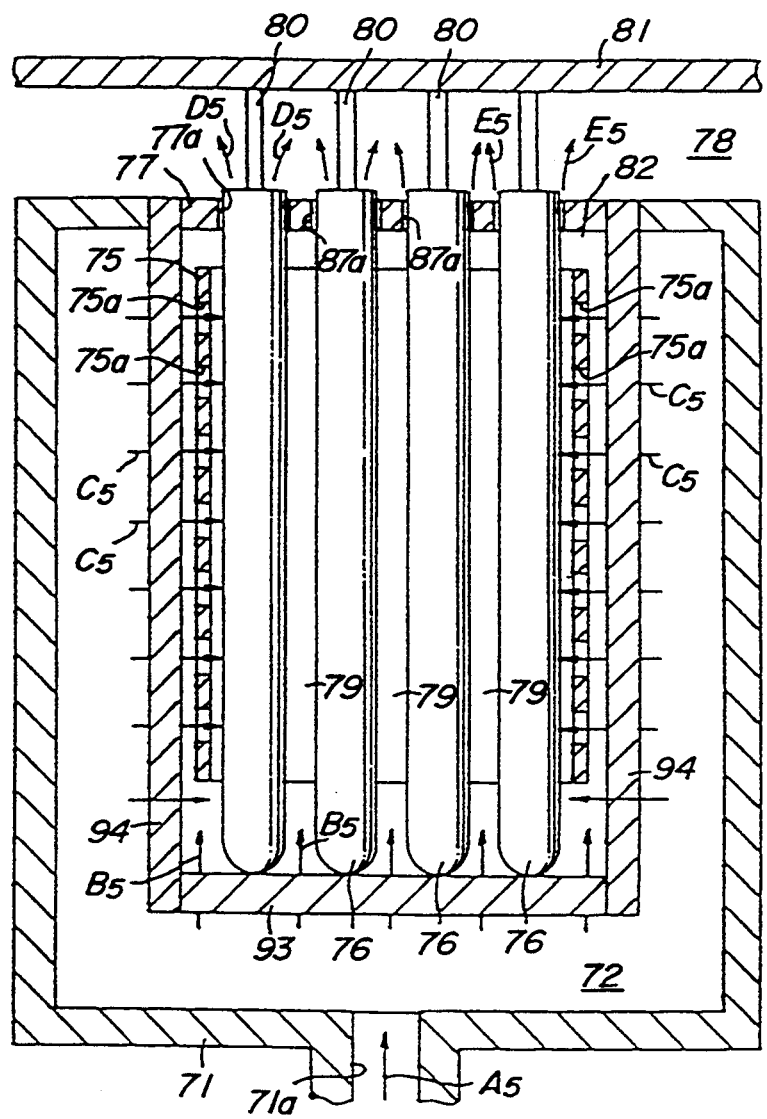
FIG_10

POWER GENERATING EQUIPMENT

BACKGROUND OF THE INVENTION

1) Field of the Invention

The present invention relates to power generating equipment, particularly, to power generating equipment in which electric power is generated with the aid of solid oxide fuel cells.

2) Related Art Statement

Recently, fuel cells have been noted as a power generating source. The fuel cell is capable of directly converting chemical energy possessed by fuel to electric energy. Since the fuel cell is free from the limitation of Carnot's cycle, the fuel cell essentially has a high energy conversion efficiency. Further, various fuels such as naphtha, natural gas, methanol, coal reformed gas and heavy oil may be used. Additionally, these fuels may be used with a low pollutant level. Moreover, the power generating efficiency of the fuel cells is not influenced by the scale of the equipment. Therefore, power generating equipment using solid oxide fuel cells is an extremely promising technique.

Particularly, since the solid oxide fuel cell (hereinafter abbreviated as SOFC) operates at a high temperature of 1000° C. or more, the activity of electrodes thereof is very high and the use of a noble metal catalyst such as expensive platinum is not required. In addition, since the SOFC has a low polarization and a relatively high output voltage, the energy conversion efficiency is considerably higher than that of the other fuel cells. Furthermore, since the SOFC is constructed with solid materials, it is stable in structure and has a long life.

FIG. 1 is a cross-sectional view showing an example of a conventional power generating equipment using hollow-cylindrical type SOFCs.

In FIG. 1, a round bottomed hollow-cylindrical SOFC element 5 comprises a round bottomed cylindrical porous support tube 6, an air electrode 7 formed on an outer periphery thereof, and a solid electrolyte 8 and a fuel electrode 9 arranged around the outer periphery of the air electrode 7 in this order. Generally, a plurality of such SOFC elements 5 are connected in series and parallel to constitute a collected cell, and the collected cell is provided at a given position in a power generating chamber 13. Only one SOFC element is drawn in FIG. 1 for ease of explanation. At the lower side of the power generating chamber 13, a fuel gas chamber 14 is provided; and the fuel gas chamber 14 is separated from the power generating chamber 13 by a bottom side division wall 11. Additionally, At the lower side of the fuel gas chamber 14, a heat insulating wall 12 is provided. On the other hand, at the upper side of the power generating chamber 13, a gas exhaust chamber 3 is arranged, which is separated from the power generating chamber 13 by an upper side division wall 4. In the upper side division wall 4, a hole 4a is provided, through which an opening side end portion of the SOFC element 5 is inserted. At the upper side of the gas exhaust chamber 3, a heat insulating wall 1 is arranged having hole 1a, through which an oxidizing gas supply tube 2 is inserted so as to be held by the hole 1a. Then, a top end opening 2a of the oxidizing gas supply tube 2 is positioned in an internal space 10 of the SOFC element 5.

When operating the hollow-cylindrical SOFC, an oxidizing gas is supplied into the oxidizing gas supply tube 2 as shown by an arrow A, then the flow of the oxidizing gas supplied from the tube 2 is converted at the bottom portion of the element 5 and the gas is fed through the internal space 10 to be exhausted into the gas exhaust chamber 3 as shown by arrows B. On the other hand, when a fuel gas is supplied into a fuel gas chamber 14 through a fuel gas supply hole 12a formed in the heat insulating wall 12 as shown by an arrow C, pressure in the fuel gas chamber 14 becomes high; then the fuel gas is supplied into the power generating chamber 13 through the fuel gas supply holes 11a formed in the division wall 11, as shown by arrows D. The fuel gas is then fed in an upper direction along the surface of the fuel electrode 9 of the SOFC element 5. Oxygen ions diffused in the solid electrolyte 8 are reacted with the fuel gas on the surface of the fuel electrode 9. As a result, an electric current is fed between the air electrode 7 and the fuel electrode 9. The used fuel gas is exhausted into the gas exhaust chamber 3 through the space 4a formed between the upper side division wall 4 and an opening end portion of the SOFC element 5, as shown by arrows E. The power generating equipment having no sealing as shown in FIG. 1 is preferred to be used, because the SOFC element 5 is operated under a high temperature about 1000° C.

In order to put such power generating equipment in practical use, it is necessary to decrease the manufacturing cost therefore and to increase the power density of the equipment. Therefore, i t is necessary to make the length of the SOFC element 5 long to increase the power generating output per one SOFC element.

However, in the power generating equipment having its constitution as shown in FIG. 1, there is a drawback that a temperature gradient is generated in the power generating chamber 13 due to the concentration gradient of the fuel gas flow in the chamber 13. That is to say, in the vicinity of the through holes 11a, through which the fuel gas is supplied into the chamber 13, the content of fuel is still large, so that a large amount of fuel is consumed by an electrochemical reaction there and hence the temperature of the atmosphere in the vicinity of the through holes 11a increases. Due to the temperature increase, the electrochemical reaction of the oxygen ions and the fuel on the fuel electrode 9 becomes more intense.

On the other hand, at a distant portion from the fuel supply holes 11a, the concentration of the fuel gas becomes low, and then the fuel amount consumed electrochemically is also decreased. Therefore, the temperature at the upper portion of the fuel electrode 9 and the electrochemical reaction are not elevated and remain relatively low. Additionally, a large amount of $CO_2$, steam, etc. is contained in the fuel gas, whose concentration has been reduced, and the $CO_2$ or steam adheres on the surface of the fuel electrode 9 to obstruct the reaction. Thus, the electrochemical reaction becomes increasingly inactive along the upper side of the chamber 13.

Therefore, there is a large temperature gradient which is generated between the upperstream side and the downstream side of the fuel gas flow in the chamber 13. When such power generating equipment is operated for a long time, the temperature gradient not only causes cracks on the SOFC element 5 but also decreases the power generating efficiency thereof. This tendency becomes more considerable as each of cylindrical SOFC elements 5 is lengthened.

SUMMARY OF THE INVENTION

The present invention has for its object to provide novel power generating equipment in which the fuel concentration gradient in the fuel gas flow in the power generating chamber is small to reduce the temperature gradient in the chamber caused thereby.

In order to carry out this object, the power generating equipment according to the invention comprises:

a plurality of cylindrical solid oxide fuel cell elements being electrically connected to each other to constitute a collecting cell;

current collecting members being connected to positive and negative electrodes of said collecting cell;

a power generating chamber for containing said collecting cell and said current collecting members;

an oxidizing gas chamber being separated from said power generating chamber by a first partition;

a fuel gas chamber being separated from said power generating chamber by a second partition;

an oxidizing gas supply means for supplying an oxidizing gas from said oxidizing gas chamber into an internal space of each of said solid oxide fuel cell element via said first partition; and a fuel gas supply means for supplying a fuel gas from said fuel gas chamber to said power generating chamber via said second partition to generate an electric power by a reaction of said oxidizing gas and said fuel gas; and a fuel gas introducing means for introducing said fuel gas into said power generating chamber such that a fuel gas concentration in said power generating chamber is maintained relatively constant in a longitudinal direction of said solid oxide fuel cell elements.

Since the power generating equipment according to the present invention comprises the fuel gas introducing means by which the fuel gas concentration in the power generating chamber is maintained relatively constant in a longitudinal direction of the solid oxide fuel cell elements, it is possible to prevent to generation at a temperature gradient due to a concentration gradient of the fuel gas flow in the power generating chamber. Therefore, according to the invention, cracks on the solid oxide fuel cell elements are apt not to be generated and a power generating efficiency of the equipment can be improved.

The first aspect of the power generating equipment according to the invention is that said fuel gas introducing means comprises fuel gas supply tubes arranged in the power generating chamber, the fuel gas supply tubes being arranged between the successively arranged solid oxide fuel cells (SOFC) elements and being perpendicular to the longitudinal direction of the SOFC elements. and The fuel gas is supplied from the outer circular surface of said fuel gas supply tube into the power generating chamber.

Since the fuel gas is supplied from the outer circular surface of the fuel gas supply tubes arranged between the solid oxide fuel cells, the gas concentration of the fuel gas flow in the power generating chamber can be made constant in the longitudinal direction of the element.

The fuel gas supply tubes may be made of a conductive material, such as conductive metal and conductive ceramics, or non-conductive material. In case the fuel gas supply tubes are made of the conductive material, it may be possible to arrange the fuel gas supply tubes so as to directly contact with the neighbor SOFC elements to make an electrical contact between the successively arranged SOFC elements via the fuel gas supply tubes per se: or it may be possible to provide a conductive material such as a metal felt around the fuel gas supply tubes to make an electric contact between the successively arranged SOFC elements via the metal felt and the fuel gas supply tubes.

In case the tubes are made of the non-conductive material, the electric contact between the SOFC elements should be conducted with the aid of a conductive material such as metal felt. It is preferred that the fuel gas supply tubes are arranged between the SOFC elements, which are connected in a parallel manner.

The second aspect of the power generating equipment according to the invention is that the fuel gas introducing means comprises fuel gas supply tubes arranged in the power generating chamber being parallel to the longitudinal direction of the SOFC elements arranged therein.

In the second aspect of the present invention, since the fuel gas supply tubes are arranged in the power generating chamber being parallel to the longitudinal direction of the SOFC elements, and the fuel gas is supplied into the power generating chamber via the fuel gas supply tubes, the gas concentration of the fuel gas flow in the power generating chamber is maintained relatively constant in the power generating chamber in the longitudinal direction of the SOFC elements.

Further, the third aspect of the power generating equipment according to the invention is that the fuel gas introducing means comprises third partitions, which constitutes at least a part of side wall of said power generating chamber, being arranged to be parallel with the longitudinal direction of the SOFC elements, the third partitions being for separating said fuel gas chamber from the power generating chamber and said fuel gas being supplied into the power generating chamber via the third partitions.

In the third aspect of the present invention, since the fuel gas is supplied into the power generating chamber via the third partitions, the gas concentration of the fuel gas flow in the power generating chamber becomes substantially constant in the power generating chamber in the longitudinal direction of the SOFC elements.

It should be noted that in the present invention the fuel gas refers to a gas including hydrogen, reformed hydrogen, carbon monoxide, etc; and the oxidizing gas refers to a gas including an oxidizing agent such as oxide and hydrogen peroxide.

BRIEF DESCRIPTION OF THE DRAWINGS

FIG. 10 is a cross-sectional view representing a construction of the fifth embodiment of a power generating equipment according to the invention.

DETAILED DESCRIPTION OF PREFERRED EMBODIMENTS

Figure 2:
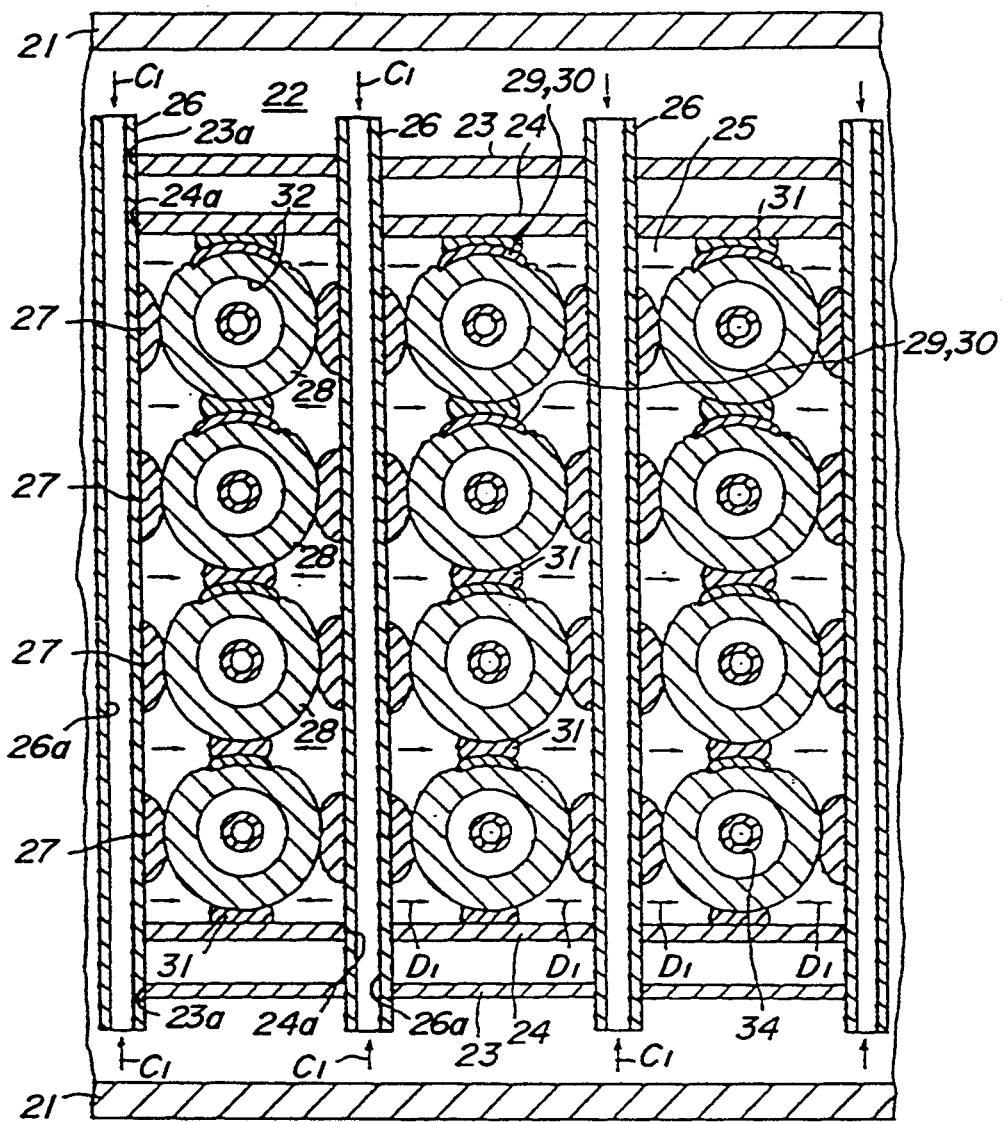
FIG. 2 is a cross-sectional view depicting a construction of a first embodiment of a power generating equipment according to the invention view from a direction perpendicular to a longitudinal direction of SOFC elements.
Figure 3:
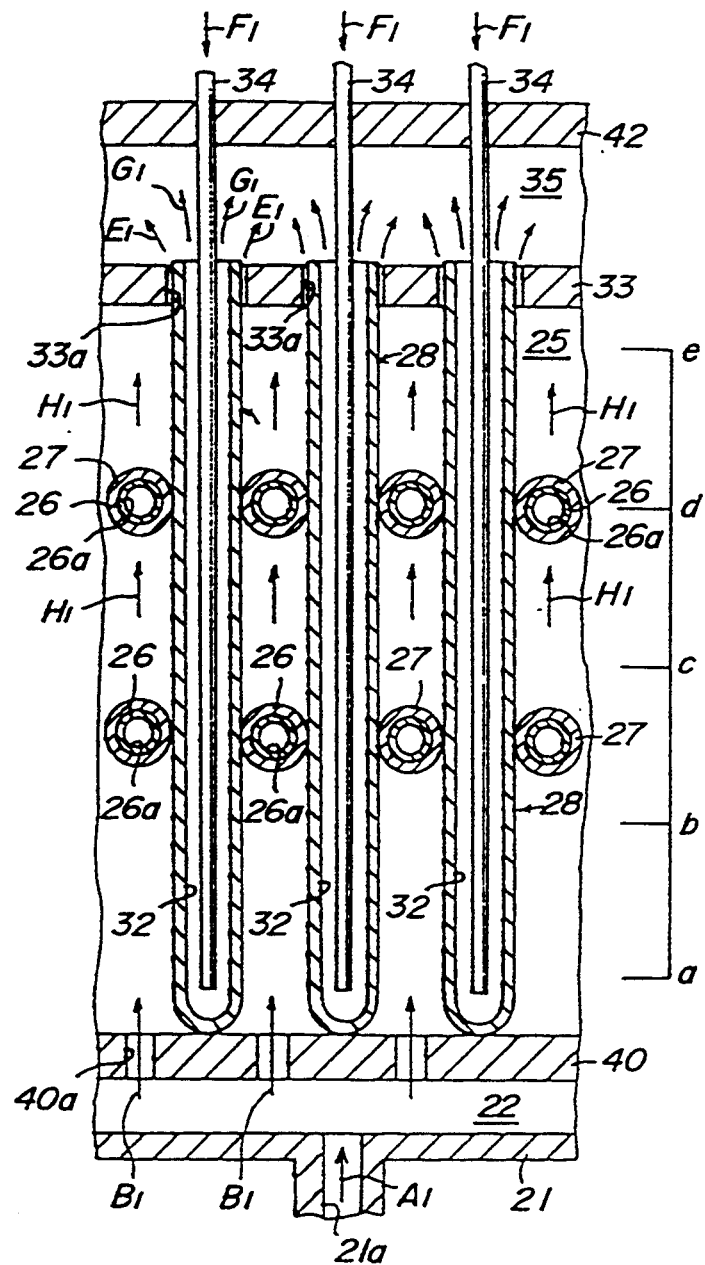
FIG. 3 is a cross-sectional view illustrating a construction of the first embodiment of a power generating equipment according to the invention viewed from a direction parallel to a longitudinal direction of SOFC elements.

FIG. 2 is a cross-sectional view showing a construction of a power generating equipment according to the first embodiment of the invention viewed from a direction perpendicular to the longitudinal direction of SOFC elements; FIG. 3 is a cross-sectional view depicting a construction of the equipment viewed from a direction parallel to the longitudinal direction of SOFC elements; and FIG. 4 is a partial enlarged-scale view of the construction shown in FIG. 2.

A plurality of bottomed cylindrical SOFC elements 28 are connected to each other in series and parallel to constitute a collecting cell. In FIG. 2, four elements 28 are connected to each other in series in a vertical direction and three rows of the elements 28 are connected in parallel in a horizontal direction. It should be noted that the numbers of cells and rows may be changed.

Figure 4:
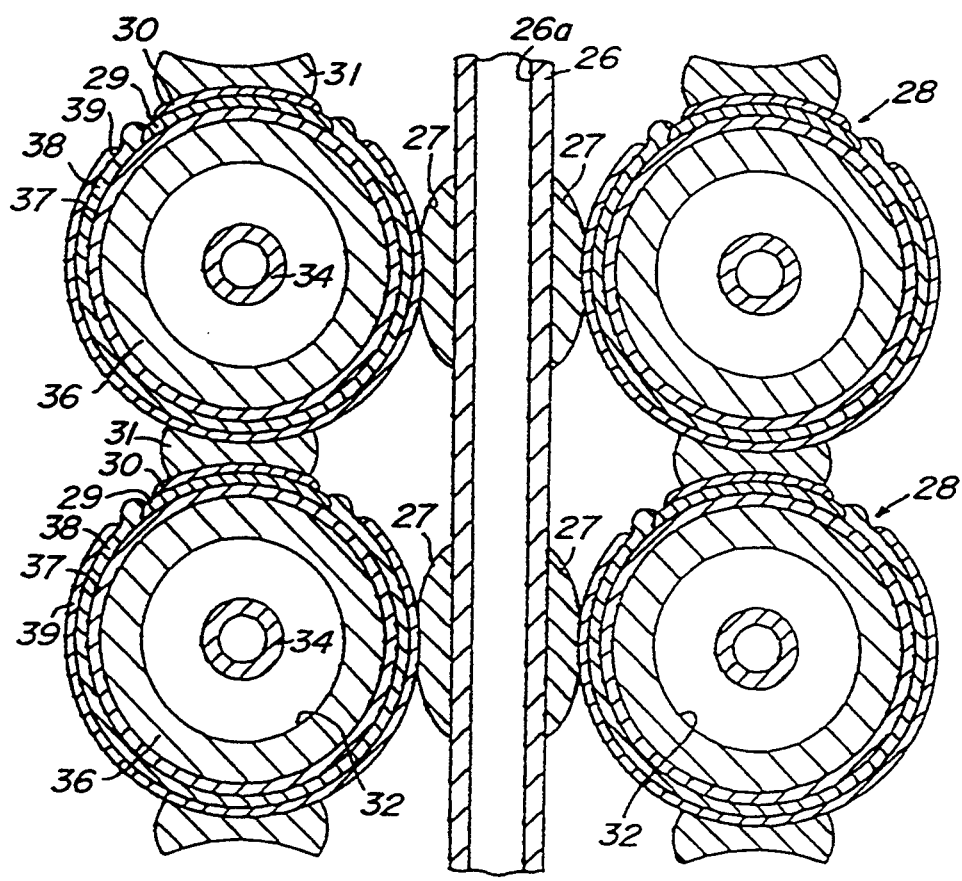
FIG. 4 is a partial cross-sectional view indicating a construction of the first embodiment depicted in FIG. 2.

As clearly shown in FIG. 4, each SOFC element 28 comprises a porous ceramic tube 36; and on an outer circumference of the tube 36 are arranged an air electrode 37, solid electrolyte 38 and fuel electrode 39, successively. Further, the solid electrolyte 38 and the fuel electrode 39 are not provided completely around the outer surface of the air electrode 37. In a rift of the solid electrolyte 38 and the fuel electrode 39 is arranged an interconnector 29 and a connecting terminal 30 from an inner side in this order. The SOFC elements 28 contiguously arranged in a vertical direction in FIG. 4 are connected in series to each other in such a manner that the air electrodes 37 are connected to the fuel electrodes 39 of the contiguous SOFC elements 28 via the interconnector 29 and the connecting terminal 30 and a metal felt 31.

For instance, four SOFC elements 28 are connected to each other in series as shown in FIG. 2. On the other hand, between the SOFC elements 28 contiguously arranged in a horizontal direction in FIGS. 2 and 4, a fuel gas supply tube 26 is arranged. In the first embodiment, two fuel gas supply tubes 26 are arranged in the respective space formed between the SOFC elements arranged in a horizontal direction, and the other fuel gas tubes 26 are provided at both sides of the rows of the element 28. On the outer circumference of each fuel gas supply tube 26, metal felt 27 is arranged at four portions at a predetermined distance. Each metal felt 27 is connected to the fuel electrodes 39 of SOFC elements 28, which are contiguously arranged in a horizontal direction in FIG. 4. The fuel gas supply tube 26 is made of a porous conductive material or a porous non-conductive material. In case the that fuel gas supply tube 26 is made of a porous conductive material, the SOFC elements 28 arranged contiguously in a horizontal direction in FIG. 4 are electrically connected to each other in parallel by means of the metal felt 27 and the fuel supply tube per se; and in case the fuel supply tube 26 is made of a porous non-conductive material, the contiguously arranged SOFC elements are connected parallel to each other by means of the metal felt 27.

The SOFC elements 28 are connected to each other in series and parallel in such a manner as to constitute a collecting cell as shown in FIG. 2. It, however, should be noted that in FIGS. 2 and 3, a detailed construction of each SOFC element is not indicated and that the interconnector 29 and the connecting terminal 30 are depicted as a single part as a matter of convenience.

The positive and negative electrodes of the thus constructed collecting cell are electrically connected to current collecting boards 24 via the metal felt 31, respectively. The pair of current collecting boards 24 serve as a current collecting member of the collecting cell for collecting an electric power generated in each SOFC element 28; and are connected to lead lines (not shown). The collecting cell and the collecting boards 24 are contained in a power generating chamber 25 as a single body.

The power generating chamber 25 comprises a first wall 33 arranged in an opening end portion side of the bottomed cylindrical-shaped SOFC elements 28. In the first wall 33, are formed a plurality of through holes 33a so as to correspond to the positions of each SOFC element 28; and the SOFC elements 28 are arranged to be inserted through the through holes 33a and to be held thereby. Into internal space 32 of each SOFC element 28, an oxidizing gas supply tube 34 is inserted.

The power generating chamber 25 further comprises a second wall 40, arranged at a bottom side of the SOFC element 28, being arranged to be perpendicular to the longitudinal direction of SOFC element 28. In the first embodiment, the bottom of each SOFC element 28 is held on the second wall 40. Further, the chamber 25 comprises a pair of side walls 23, between which the collecting cell comprising a plurality of SOFC elements 28 and the collecting boards 24 are arranged. These side walls 23 are arranged to be parallel with the longitudinal direction of the SOFC element 28; and the pair of wide walls 23 are substantially parallel to each other. It should be noted that the side walls 23 and the collecting boards 24 face each other at a short distance. Additionally, a can-like body 21 made of a heat insulated material is arranged outside the pair of side walls 23 and the bottom side second wall 40; and a fuel gas chamber 22 is arranged between the inner surface of the can-like body 21 and the bottom side second wall 40 and between the can-like body 21 and the side wall 23. In the bottom of the can-like body 21 is provided an inlet 21a for supplying the fuel gas as shown in FIG. 3.

In the second wall 40, a plurality of fuel gas supply inlets 40a are provided at a predetermined distance from each other. In the side walls 23 and the collecting boards 24, a plurality of circular through holes 23a and 24a, respectively, are provided so as to correspond to the position of the fuel gas supply tubes 26. The fuel gas supply tubes 26 are inserted into the circular through holes 23a and 24b, and are held thereby. The both end portions of the fuel gas supply tubes 26 are projected to the fuel gas chamber 22, as shown in FIG. 2.

When operating the power generating equipment, an oxidizing gas is supplied to the oxidizing gas supply tube 34 as shown by the arrows $F_1$ in FIG. 3. The oxidizing gas is blown off from the opening at the top end of the oxidizing gas supply tube 34. Then the oxidizing gas is flowed against the bottom surface of the SOFC elements 28 to be changed to the direction of the gas flow. The gas is then raised in the inner space of the SOFC elements 28 to be exhausted out to the exhaust gas chamber 35 as shown by arrows $G_1$.

On the other hand, the fuel gas is supplied from the fuel gas supply inlet 21a to the fuel gas chamber 22 as shown by an arrow $A_1$. By this fuel gas supply, a pressure in the fuel gas chamber 22 increases, so that the fuel gas in the chamber 22 is supplied into the power generating chamber 25 through the inlets 40a, as shown by arrows $B_1$.

On the other hand, since the internal space 26a of each fuel gas supply tube 26 is connected to the fuel gas chamber 22 as indicated in FIG. 2, the fuel gas is supplied into the internal space 26a from the fuel gas chamber 22 as shown by arrows $C_1$. As the fuel gas supply tube 26 is made of a heat-resistant porous material, the fuel gas flowed in the internal space 26a is blown out to the power generating chamber 25 from the outer circumferential surface of each fuel gas supply tube 26, as shown by arrows D1 in FIG. 2.

It should be noted that the metal felt 31 for making a series connection of the inter connectors 29 of each SOFC element 28 and of the SOFC elements 28 are arranged to be belt-like in shape and to be extended along the longitudinal direction of the SOFC elements 28. Therefore, the space between the contiguously arranged SOFC elements 28 is substantially filled with the belt-like shaped interconnector 29 and the metal felt 31, so the fuel gas flow could not run through the space smoothly. Thus, the fuel gas radially blown from the outer circumferential surface of the fuel gas supply tube 26 rises as shown by arrows $H_1$ in FIG. 3 to be used in power generating.

After the electric power is generated in the power generating chamber 25, the depleted fuel gas finally exhausted out to the gas exhausting chamber 35 through spaces 33a formed between the SOFC elements 28 and the first wall 33 as shown arrows $E_1$; and the depleted fuel gas is mixed with the depleted oxidizing gas therein.

The air electrode 37 can be made by doped or non-doped conductive perovskite-type oxide, such as $LaMnO_3$, $CaMnO_3$, $LaNiO_3$, $LaCoO_3$ and $LaCrO_3$; but particularly, $LaMnO_3$, in which strontium is doped, is preferably used as a material of the air electrode 37. The solid electrolyte 38 may be preferably made by yttria stabilized zirconia or yttria partially stabilized zirconia. As a material of the fuel electrode 39, nickel-zirconia cermet or cobalt zirconia cermet is preferred. Additionally, the interconnecter 29 may be preferably made by doped or non-doped perovskite-type $LaCrO_3$ or $LaMnO_3$.

In the first embodiment, since the fuel gas is supplied into the power generating chamber 25 from the outer circumference surface of the fuel gas supply tubes 26, which are made of the porous material and are arranged to be separated from the second wall 40, the fresh fuel gas can be constantly supplied not only to the bottom side of the SOFC element 28 but also to the upper opening side thereof. Therefore, the fuel concentration gradient in the power generating chamber 25 becomes small and the fuel gas is contributed in a substantially even manner in a longitudinal direction of the element 28, so that the temperature gradient of the SOFC element 28 in its longitudinal direction can be made small too. As a result, even if the power generating equipment operates for a long time, it is apt not to generate a damage such as cracks on the element 28, and further the unevenness of the electrochemical reaction on the element 28 can be minimized. Therefore it is possible to improve the power generating efficiency of each SOFC element 28.

Moreover, in the first embodiment, since the metal felt 27 is arranged between the fuel electrode of each SOFC element 28 and the fuel gas supply tube 26 so as not to directly urge the fuel electrode against the tube 26, in case the SOFC element 28 is expanded or shrunk in accordance with the temperature variation, the deformation of the SOFC element 28 due to the temperature variation is absorbed by the metal felt 27. Thus, the cracks are not apt to be generated on the surface of the SOFC element 28.

The fuel gas supply tube 26 is made of a porous conductive material or a porous non-conductive material. As a porous non-conductive material, non-conductive ceramics such as porous zirconia and alumina are preferred; and as a porous conductive material, a porous metal made by sintering a reduction resistance metal or a porous cermet made by sintering a mixture of the reduction resistance metal powder and a ceramic powder is preferred.

As the ceramic powder, for instance, a ceramic powder mainly composing alumina or zirconia can be indicated. And, as the reduction resistance metal powder, an alloy powder such as Ni-Cr, Ni-Fe-Cr, Ni-Fe-Cr-Al, Co-Ni-Cr, Fe-Cr and Fe-Cr-Al, or a powder of Ni, Co or Fe can be shown as an example.

It is preferred that the porosity of the fuel gas supply tube 26 is about 10–90%. When the porosity exceeds 90%, the strength of the tube 26 is decreased; and when the porosity is less than 10%, the fuel gas is not apt to pass through the tube 26.

It may be possible to give a porosity gradient to the fuel gas supply tube 26 so as to distribute the fuel gas in an even manner in the fuel gas chamber 25.

There are two ways to make a porosity gradient for the fuel gas supply tube 26, as discussed below.

(1) While sintering the fuel gas supply tube 26 made by a porous metal, porous cermet or porous ceramic, one end portion of the green body of the fuel gas supply tube is held and a weight is attached to the other end portion to suspend the green body. By suspending the tube, a comparatively large load is given to the holding side portion of the green body to make the porosity thereof large; and only small load is given to the weighting side of the green body, then the porosity thereof becomes comparatively small.

(2) Tubular-shaped sintered body made by a porous metal, porous cermet or porous ceramic is prepared; a filler material is impregnated in the pores of the sintered body to fill the pores to some degree with the material, then the sintered body is dried or heated to maintain the filler material in the pores. By varying the impregnating amount of the filler material, it is possible to make a gradient in the porosity of the sintered body.

The following is a method for controlling the amount of fuel gas amount blown from the outer circumference surface of the tube 26 into the power generating chamber 25.

Tubular sintered body made of porous metal is prepared, the porosity of the sintered body to being evenly distributed. A plurality of slurry bands are formed on the outer surface of the sintered body at a given distance, and then the body is sintered again. In this case, by making the width of slurry band large or by making the distance between the bands small, it is possible to control the transmission amount of the fuel gas through the tube 26 to be small. By making the width of slurry band small or by making the distance between the bands large, the transmission of the fuel gas is accelerated. Further, by selecting the grain diameter of the reduction resistance metal powder or the ceramics powder included in the slurry, it is possible to control the gas transmission amount. In this case, it is preferred that the tubular sintered body is used as a back up material, and the side thereof, on which the slurry is arranged, faces to the power generating chamber.

Heat insulating densified material or reduction resistance densified material may be used as the material of the fuel gas supply tube 26. In this case, a plurality of through holes should be formed in the wall of the fuel gas supply tube 26. The diameter, position and number of the through holes are determined so as to evenly distribute the fuel gas along the surface of the SOFC element 28. Nickel-series or Co-series alloys such as Hastelloy and Inconel (Trademark) are preferred to be used as a densified material of the fuel gas supply 26.

In the first embodiment, the metal felt 27 is arranged between the contiguously arranged SOFC elements 28. However, if the fuel gas supply tube 26 is made of the porous conductive material, it may be arranged such that the fuel gas supply tube 26 is directly contacts the outer surfaces of the contiguously arranged SOFC elements to electrically connect the SOFC elements in a parallel manner. Further, the position, number, inner diameter, outer diameter of the fuel gas supply tube 26 may be altered for convenience. In the first embodiment, in order to supply the fuel gas into the power generating chamber 25 effectively and to prevent that the size of the collecting cell from becoming large, it may be preferred to arrange the outer diameter of the fuel gas supply tube 26 about 1–8 min.

In the first embodiment, each SOFC element 28 is held in a vertical direction, that is to say, the longitudinal direction of the SOFC element 28 is extended in the vertical direction. However, it may be possible to arrange the elements that the longitudinal direction thereof is extended in the horizontal direction. Further, in the first embodiment, round bottomed- cylindrical-shaped SOFC elements are used, but it may be possible to use cylindrical SOFC element having openings at both ends thereof.

Figure 1:
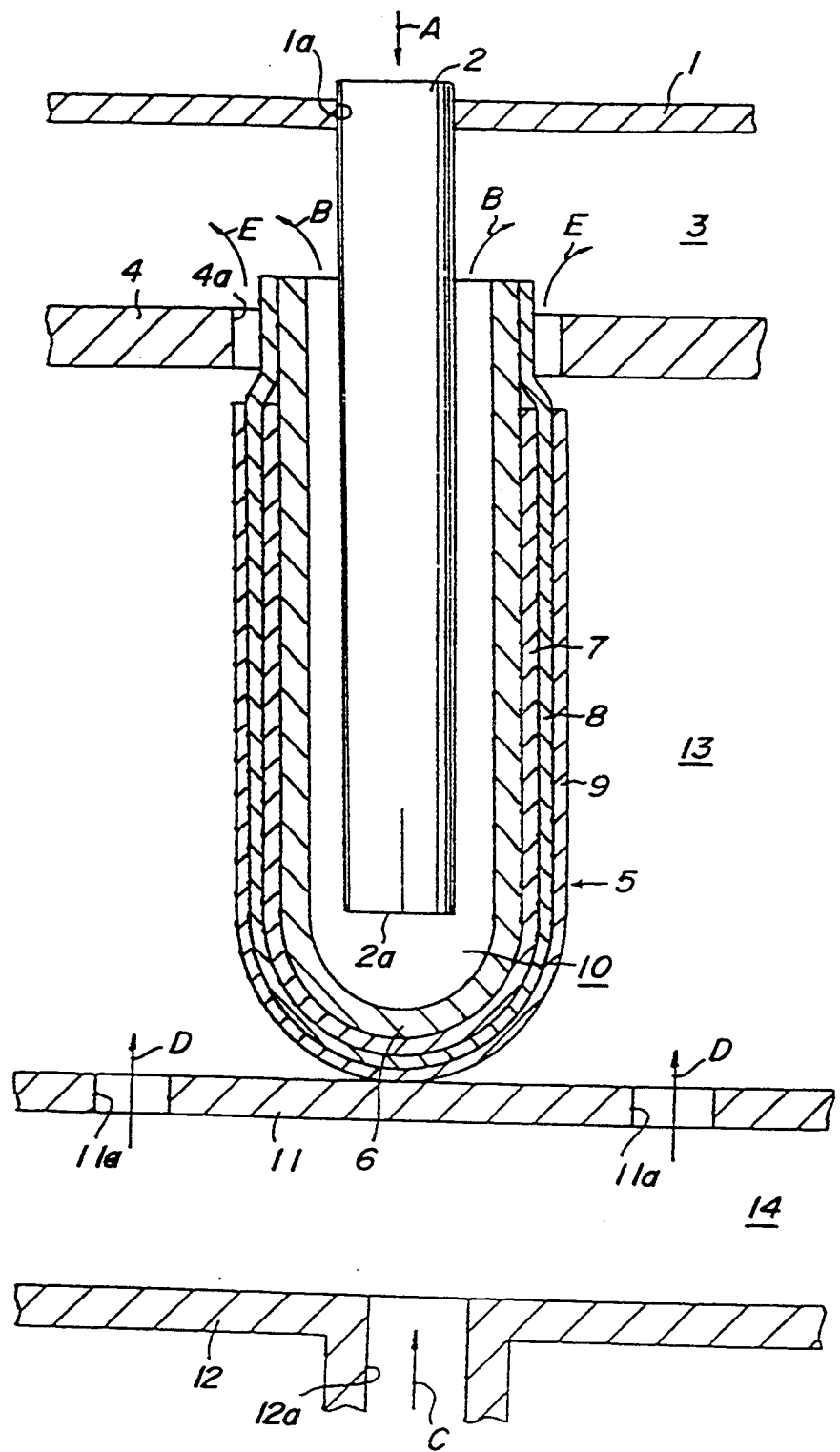
FIG. 1 is a partial cross-sectional view showing a construction of a conventional power generating equipment.

The present inventors conducted an experiment to measure the temperature gradients in the power generating chamber in the longitudinal direction of SOFC element of both the conventional equipment shown in FIG. 1 and the present equipment shown in FIGS. 2 to 4. The temperature measuring points a,b,c,d,e are indicated in FIG. 3. Each distance between the measuring points is 100 mm. A gas containing 96% of hydrogen and 4% of steam was used as the fuel gas and air was used as the oxidizing gas. A thermocouple was used to measure the temperature of the SOFC elements. Further, the power outputs per one SOFC element in the conventional and present equipment were compared. The experimental results are shown in Table 1.

TABLE 1

| | Temperature (°C.) | | | | | Output |
| | a | b | c | d | e | (W) |
| Conventional equipment (FIG. 1) | 1032 | 1020 | 1005 | 944 | 870 | 7.8 |

TABLE 1-continued

| | Temperature (°C.) | | | | | Output |
| | a | b | c | d | e | (W) |
| First embodiment (FIGS. 2 to 4) | 1022 | 1013 | 1047 | 1031 | 1019 | 10.6 |

As clear from the Table 1, a small temperature gradient along the SOFC element and a large output can be obtained in the present equipment.

Figure 5:
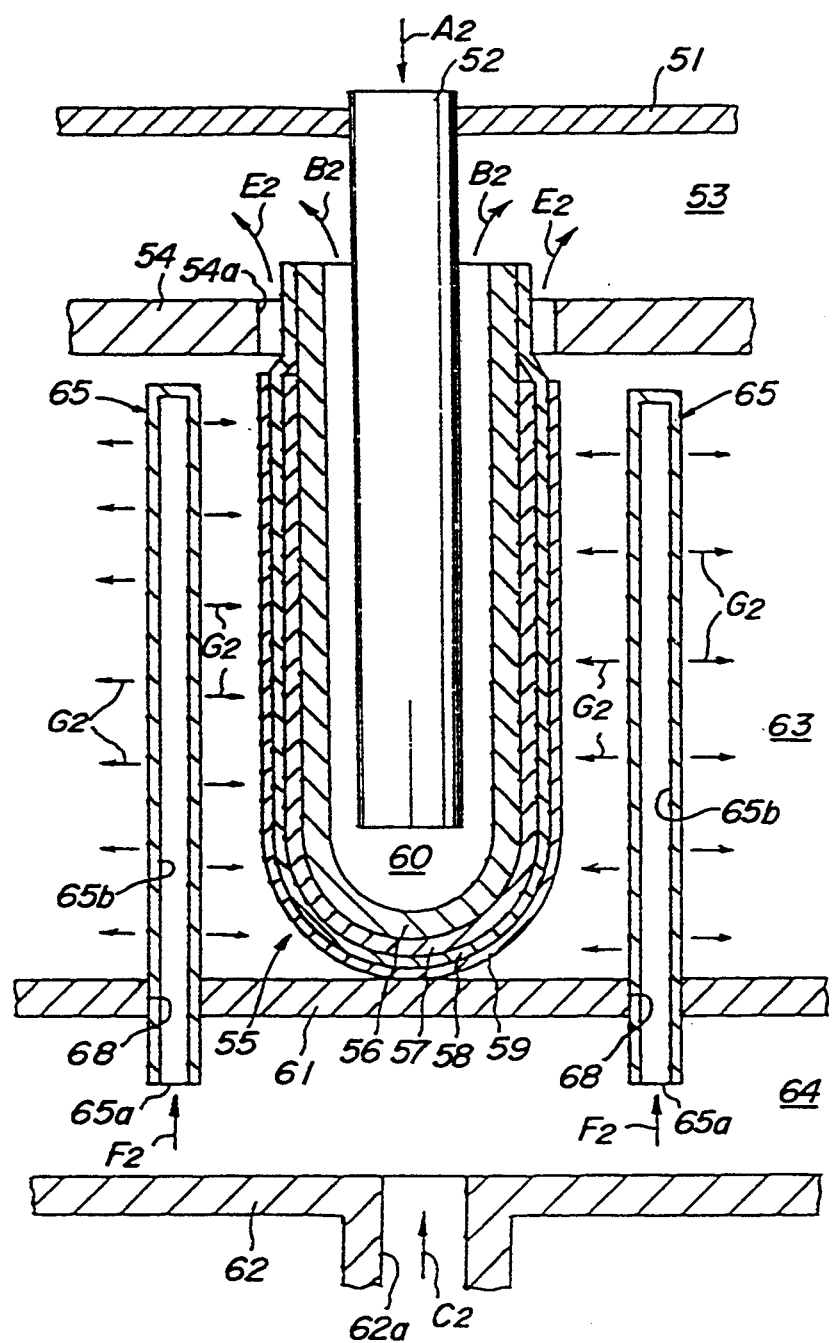
FIG. 5 is a cross-sectional view presenting a construction of the second embodiment of a power generating equipment according to the invention.

FIG. 5 is a cross-sectional view showing the power generating equipment according to the second embodiment of the present invention. In FIG. 5, only one round bottomed cylindrical SOFC element 55 is indicated, but a plurality of round bottomed cylindrical SOFC elements are actually connected to each other in a series and/or parallel manner to constitute a collecting cell and the collecting cell is provided in the power generating chamber 63 as a single body. SOFC element 55 includes support tube 56, air electrode 57, solid electrolyte 58, fuel electrode 59 and internal space 60.

The power generating chamber 63 comprises a first wall 54 being arranged at an opening side of the SOFC element 55. In the first wall 54 are formed a plurality of circular through holes 54a whose positions correspond to the positions of the SOFC elements 55, and the SOFC elements 55 are inserted into the through holes 54a and held thereby, respectively. Into the inner spaces 60 of the SOFC elements, are inserted the oxidizing gas supply tubes 52, respectively.

The power generating chamber 63 further comprises a second wall 61, which is arranged at a bottom side of the SOFC element 55. The second wall 61 is arranged to be substantially perpendicular to a longitudinal direction of the SOFC elements 55. The bottoms of the SOFC elements 55 are held on the second wall 61. The power generating chamber 63 is separated from the gas exhausting chamber 53 by means of the first wall 54 and separated from the fuel gas chamber 64 by means of the second wall 61.

In the second wall 61, circular holes 68 are formed at a given positions, through which the fuel gas supply tubes 65 are inserted and fixed therein. In the second embodiment, the fuel gas supply tubes 65 are arranged such that a longitudinal direction of these fuel gas supply tubes 65 is parallel with the longitudinal direction of the SOFC elements 55. The fuel gas supply tube 65 has a cylindrical shape and is made of a porous material. An opening of the fuel gas supply tube 65 is projected from the second wall 61 into the fuel gas chamber 64, and the main body of the tube 65 is extended in the power generating chamber 63.

When operating the power generating equipment, an oxidizing gas is supplied into the internal spaces 60 of the oxidizing gas supply tubes 52 as shown by an arrow $A_2$. The oxidizing gas is blown out from the top openings of the tubes 52, and the direction of the gas flow is changed by the bottom of the SOFC element 55 to an upper direction in FIG. 5 and exhausted out to the gas exhaust chamber 53 formed between heat insulating wall 51 and first wall 54, as known by arrow $B_2$.

On the other hand, the fuel gas is supplied into the fuel gas chamber 64 via the fuel gas supply hole 62a in can-like as body 62 shown by an arrow $C_2$. By this gas supply, the pressure in the fuel gas chamber 64 is increased, so that the fuel gas is fed into an inner space 65b through openings 65a of the fuel gas supply tube 65, as shown by arrows F2. Since each fuel gas supply tube 65 is made of porous material, the fuel gas is fed out to the power generating chamber 63 from all of the surface of the tube 65, as shown by arrows $G_2$. After generating electric power, the fuel gas is depleted and then exhausted out to the gas exhaust chamber 53 via a space 54a formed between each SOFC element 55 and the first wall 64 as shown by arrows $E_2$, and the depleted fuel gas is mixed with the depleted oxidizing gas therein.

In the present embodiment, the fuel gas is supplied to the power generating chamber 63 via the entire surface of the fuel gas supply tubes 65, which are arranged in the chamber 63 being parallel to the SOFC elements 55. Therefore, it is possible to constantly supply a fresh fuel gas not only to the bottom side of the SOFC elements but also to the opening side thereof. Since the fuel gas is distributed in the power generating chamber 63 in an even manner, the temperature gradient in the longitudinal direction of the SOFC elements 55 becomes small. As a result, even if the power generating equipment is operated for a long time, defects such as cracks are not apt to be generated in the SOFC elements 55. Further, since unevenness of the electrochemical reaction is also reduced, the power generating efficiency can be improved.

The fuel gas supply tube 65 should be stable against the high temperature fuel gas. Thus, a porous metal, which is made by sintering a reduction resistant metal powder, or a porous cermet, which is made by sintering a mixture of a reduction resistant metal powder and a ceramic powder, is preferred as the material of the tube 65.

Ceramic powder mainly composed of alumina or zirconia can be cited as the ceramic powder. Alloy powders such as Ni-Cr. Ni-Fe-Cr, Ni-Fe-Cr-Al, Co-Ni-Cr, Fe-Cr and Fe-Cr-Al or powders of Ni, Co and Fe can be cited as the reduction resistant metal powder.

The porosity of the fuel gas supply tube 65 is preferred to be 10–90%, particularly 30–70%. When the porosity exceeds 90%, the strength of the tube 65 is decreased, and when the porosity is less than 10%, the transmission amount of the fuel gas becomes small.

The porosity may be arranged along the fuel gas supply tube 65 in an even manner, or it may be possible to arrange a constant or stepwise gradient in the porosity in such a manner that the porosity at the fuel gas supply side is made low and it becomes higher the closer it comes to the gas exhaust side, in order to make the temperature of the SOFC element 55 even.

The method for arranging the gradient in the porosity of the fuel gas supply tube explained in the first embodiment can also be applied for the fuel gas supply tube of the second embodiment, and the control of the gas transmission amount from the wall of the fuel gas supply tube 65 can be conducted as well as that of the first embodiment.

The same materials cited in the first embodiment for the air electrode, solid electrolyte, and fuel electrode are preferred to be used as the materials for those of the second embodiment.

Figure 6:
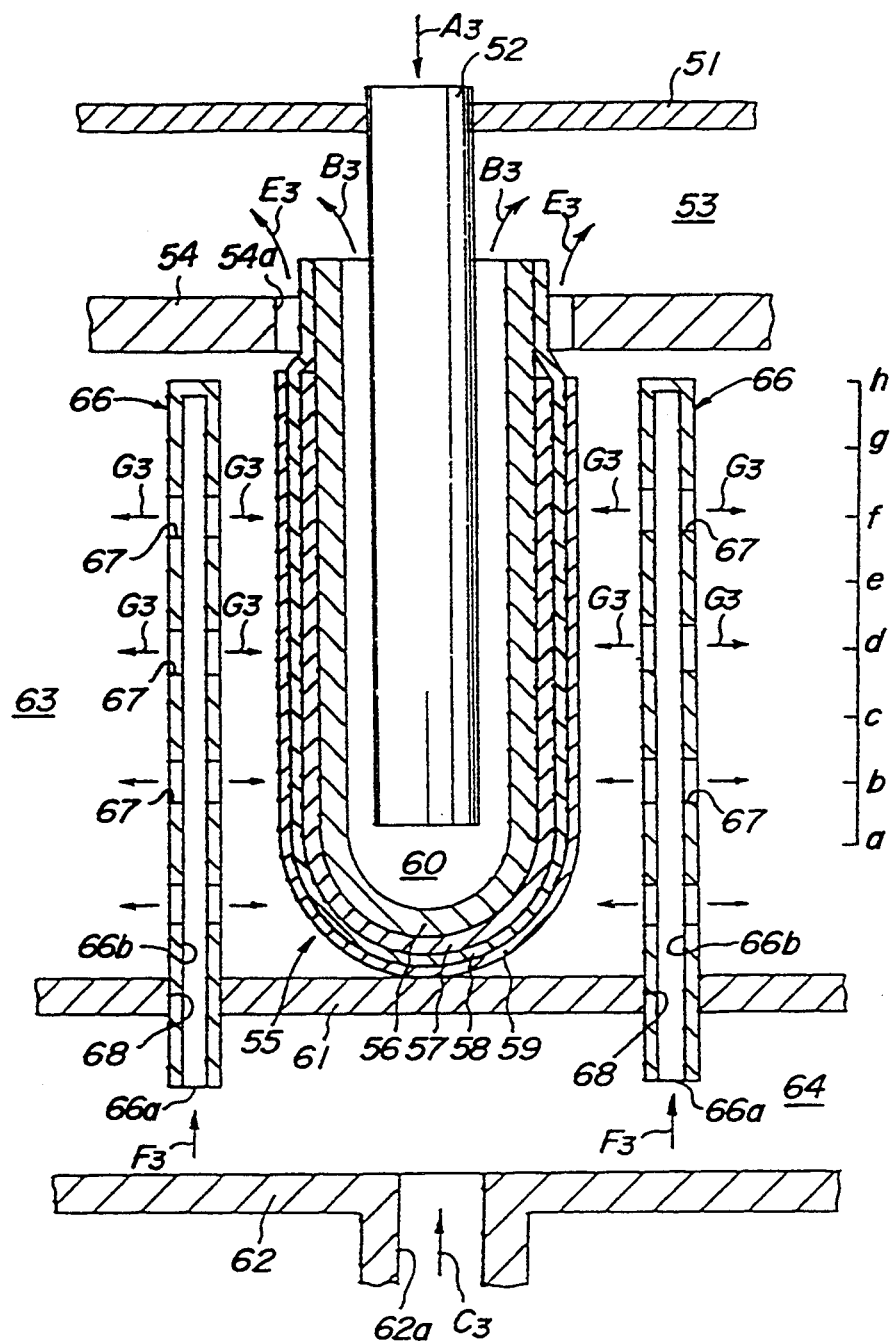
FIG. 6 is a cross-sectional view showing a construction of the third embodiment of a power generating equipment according to the invention.

FIG. 6 is a cross-sectional view illustrating the power generating equipment according to the third embodiment of the present invention. It should be noted that the same numerals are used for the same members of the equipment shown in FIG. 5 and an explanation is therefore omitted.

In the third embodiment, the construction of the equipment is almost the same as that of the second embodiment, except that the fuel gas supply tube 66 is made of a densified material and a plurality of through holes for transmitting the fuel gas are formed in the side wall of the tube 66. When operating the power generating equipment, the fuel gas is supplied to the fuel gas chamber 54 as shown by an arrow $C_3$, and then the gas is fed into the inner space 66b of through opening 66a the fuel gas supply tube 66 as shown by arrows $F_3$. The gas fed in the inner space 66b is blown out to the power generating chamber 63 via the through holes 67 as shown by arrows $G_3$ in accordance with a gas pressure distribution in the inner space 66b, diameters and positions of the through holes 67. The depleted fuel gas is exhausted into exhaust chamber 53 as shown by arrows $E_3$.

Oxidizing gas is fed into the SOFC element 55 through oxidizing gas supply tube 52 as shown by the arrow $A_3$. The oxidizing gas is exhausted into exhaust chamber 53 as shown by arrow $B_3$.

In the third embodiment, since the fuel gas is supplied into the power generating chamber 63 from the side wall of the fuel gas supply tube 66 via the through holes 67, it is possible to obtain the same effect as that of the second embodiment shown in FIG. 5

However, in the third embodiment, in order to distribute the fuel gas concentration more stably and evenly in the chamber 63 in a longitudinal direction of the SOFC elements 55, it is necessary to control the positions and diameters in a suitable manner.

In comparison with the second embodiment and the third embodiment, it can be said that the equipment according to the second embodiment, in which the fuel gas supply tube is made of the porous material, has a greater effect that the third embodiment. Further, the fuel gas supply tube according to the second embodiment can be manufactured at a lower cost, because the process for making through holes in the side wall of the fuel gas supply tube is not necessary.

A heat resistant metal or ceramic, having a proof characteristic for the fuel gas and being stable at the operating temperature of the SOFC element, is desired as a material of the tube 66. Alloys such as Ni-Cr, Ni-Fe-Cr, Ni-Fe-Cr-Al, Co-Ni-Cr, Fe-Cr, Fe-Cr-Al can be cited as such heat resistant metals.

In the second and third embodiments, the SOFC elements are arranged to be held in a vertical direction, but it may be possible to arrange the SOFC elements in a horizontal direction.

A shape of cross-section of the fuel gas supply tubes 65, 66 may be arranged to be square, rhomboid, rectangular or hexagonal, etc. Shapes of outer contour or inner contour of cross-section of the SOFC element 55 may be also arranged to be square, thombold, rectangular or hexagonal, etc.

Further, the collecting cell constituted by a plurality of SOFC elements 55 is generally contained inside of heat insulating walls. In the embodiments mentioned in the above, the side walls constituting of the power generating chamber 63 work for heat insulating. It may be possible to arrange the fuel gas supply tubes 65, 66 of the second and third embodiments on the heat insulating walls and, while extending into the power generating chamber 63.

The present inventors conducted an experiment to measure temperature gradients in the power generating chamber in the longitudinal direction of SOFC element 55 as to the power generating equipment shown in FIG. 1, FIG. 5 and FIG. 6. The temperature measuring points a, b, c, d, e, f, g and h are indicated in FIG. 6, the distance between each measuring point being about 60 mm. A gas containing 96% of hydrogen and 4% of steam was used as the fuel gas and air as the oxidizing gas. Thermocouples were used to measure the temperature of the SOFC element 55. The power output per one SOFC element of each equipment was also measured and compared. The measurement result is shown in Table 2.

TABLE 2

| | Temperature (°C.) | | | | | | | | Temperature difference (°C.) | Output (W) |
|---|---|---|---|---|---|---|---|---|---|---|
| | a | b | c | d | e | f | g | h | | |
| Conventional equipment (FIG. 1) | 1052 | 1048 | 1032 | 1025 | 1001 | 960 | 890 | 866 | 186 | 7.4 |
| Second embodiment (FIG. 5) | 1041 | 1058 | 1052 | 1044 | 1055 | 1036 | 1037 | 1017 | 41 | 12.3 |
| Third embodiment (FIG. 6) | 1051 | 1038 | 1058 | 1033 | 1039 | 1016 | 1027 | 982 | 76 | 10.7 |

As apparent from Table 2, in the second and third embodiments, the temperature gradient in the measuring points a–h is smaller than the conventional apparatus, and thus the power output of the equipment becomes greater than the conventional equipment.

Figure 7:
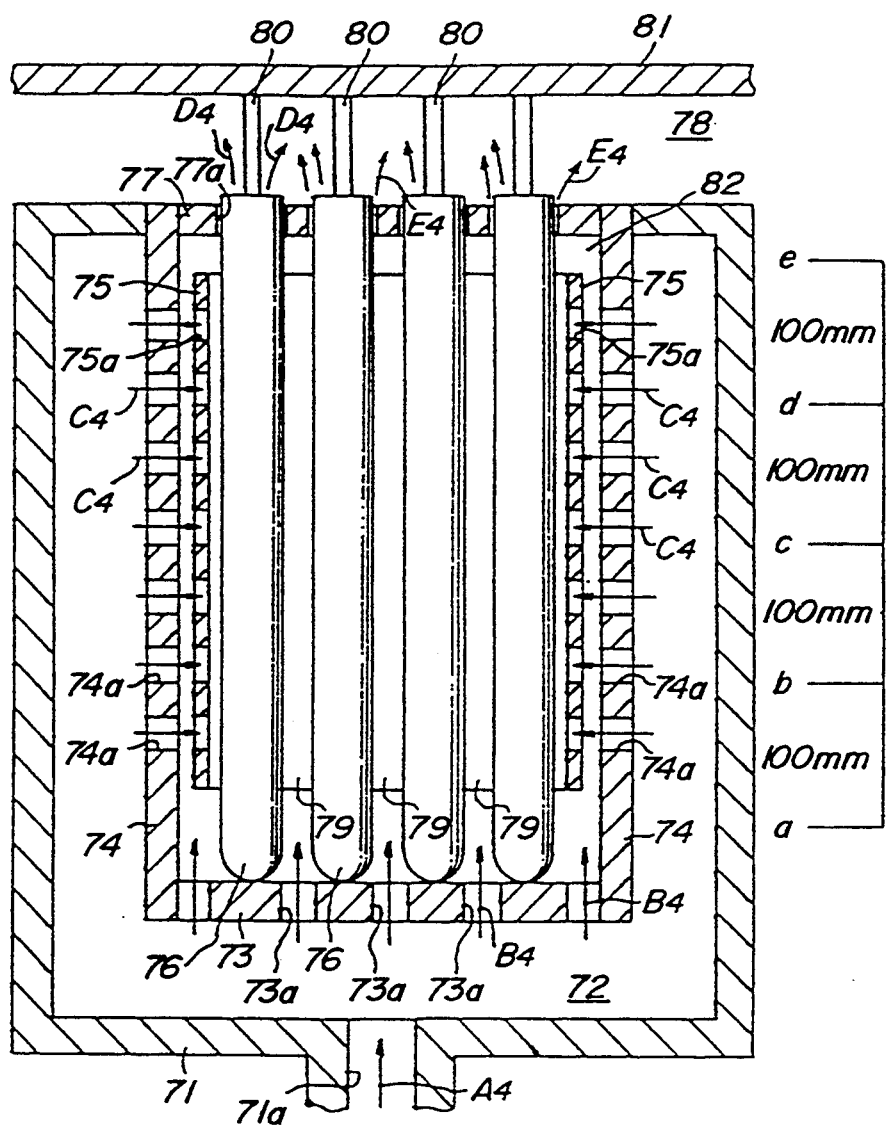
FIG. 7 is a cross-sectional view depicting a construction of the fourth embodiment of a power generating equipment according to the invention.
Figure 8:
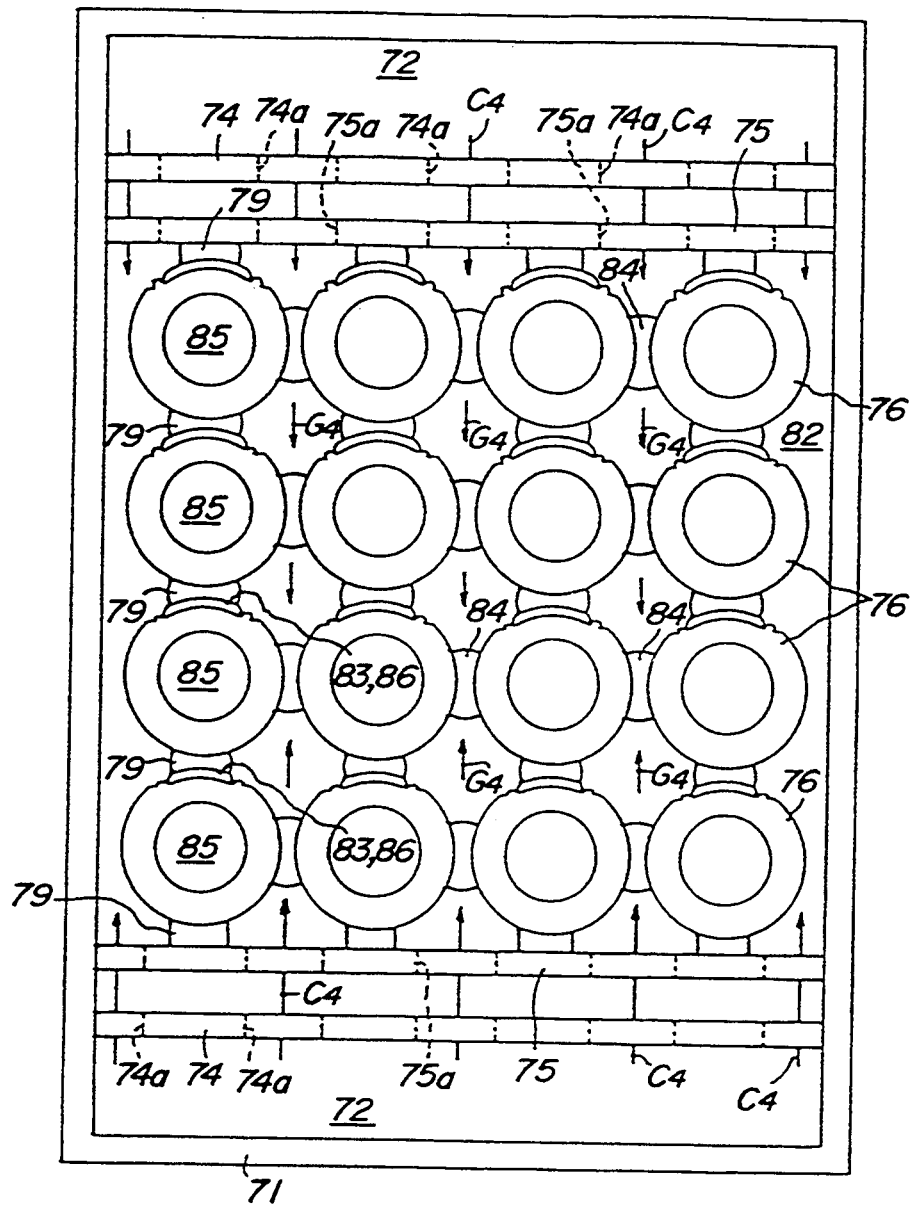
FIG. 8 is a partial plan view illustrating a construction of the fourth embodiment depicted in FIG. 7.
Figure 9:
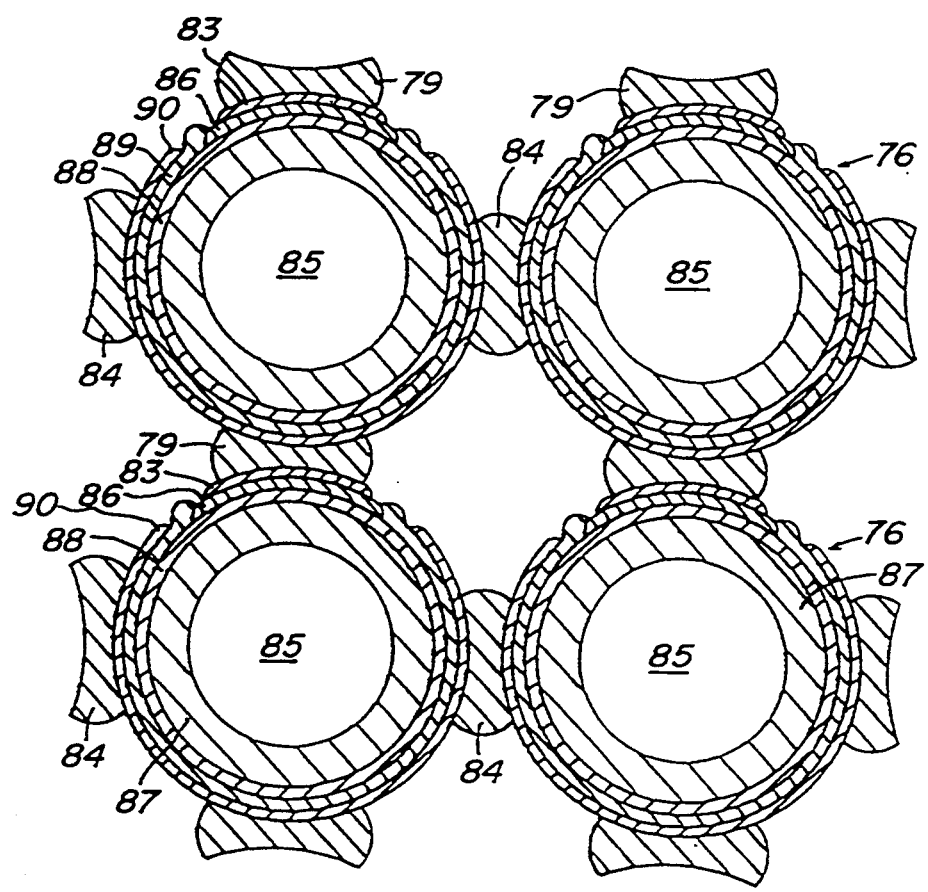
FIG. 9 is an enlarged-scale plan view indicating a construction of the fourth embodiment illustrated in FIG. 8.

FIG. 7 is a cross-sectional view showing a power generating equipment of the fourth embodiment of the present invention, and FIG. 8 is a partial plan view representing one part of the equipment shown in FIG. 7. Further, FIG. 9 is a partial plan view indicating one part of the equipment shown in FIG. 8 in an enlarged-scale.

Round bottomed cylindrical SOFC elements 76 are connected in series and parallel to constitute a collecting cell. In the fourth embodiment, the SOFC elements 76 are arranged in four by four pattern. In FIG. 8, the longitudinally arranged elements are connected to each other in series, and horizontally arranged elements are connected to each other in parallel, but this arrangement is possible to change as desired.

The construction of each SOFC element 76 is the same as that of the first embodiment and connection thereof is also the same as that of the first embodiment. In the fourth embodiment, the numeral 87 represents a porous support tube, 88 air electrode, 89 solid electrolyte, 90 a fuel electrode; 86 an interconnector, 83 connecting terminal and 79 represents a metal felt.

The SOFC elements 76 are connected to each other in series and parallel to constitute a collecting cell shown in FIG. 8, in which four by four SOFC elements are arranged. It should be noted that in FIGS. 7 and 8, a detailed construction of each SOFC element is not drawn and the interconnector 86 and the connecting terminal 83 are shown as a single body.

The positive and negative electrodes of the thus structured collecting cell are electrically connected to a pair of current collection boards 75 via the metal felt 79. The pair of current collection boards 75 serve as a current collector of the collecting cell, and the boards 75 are connected to lead lines (not shown), respectively. The collecting cell and the current collection boards 75 are contained in the power generating chamber 82 as a single body.

The power generating chamber 82 comprises a first wall 77 arranged at an opening side of SOFC element 76. In the first wall are provided circular through holes 77a so as to correspond to the SOFC elements 76. The SOFC elements 76 are inserted into the through holes 77a, respectively, to be held thereby. In the inner space 85 of each SOFC element is inserted an oxidizing gas supply tube 80. The oxidizing gas is fed in an upper direction in FIG. 7 to be exhausted to the gas exhaust chamber 78. The gas flow is shown by arrows D4 in FIG. 7.

The power generating chamber 82 further comprises a second wall 73, which is arranged at a bottom side of SOFC element 76 so as to be perpendicular to the longitudinal direction of the SOFC element. On the second wall 73, are held the bottoms of the SOFC elements 76. The power generating chamber 82 further comprises a pair of side walls 74 arranged to be parallel to each other and also parallel to the longitudinal direction of the SOFC element 76. The side walls 74 are arranged to be separated from the current collection boards 75 by a distance. A can-like body 71 made by a heat insulating material is arranged surround the power generating chamber 82.

Between the can-like body 71, the second wall 73 and the side walls 74 is provided the fuel gas chamber 72. The cross-sectional view of the fuel gas chamber 72 is U-shaped as shown in FIG. 7, and the upper end of the fuel gas chamber 72 is separated from the exhaust gas chamber 78 by means of the upper wall of the can-like body 71. It should be noted that in the bottom of the can-like body 71, is provided a fuel gas supply hole 71a.

In the second wall 73 of the power generating chamber 82, a plurality of through holes 73a for transmitting the fuel gas are regularly provided with a given distance. Further, in the respective side walls 74, there are provided a plurality of through holes 74a in a matrix manner. Furthermore, in the respective current collection boards 75 are provided a plurality of through holes 75a in a matrix manner so as to make the diameters and positions of the holes 74a in the side walls 74 coincident with those of the holes 75a in the current collection boards 75.

When operating the power generating equipment according to the fourth embodiment, the fuel gas is supplied into the fuel gas chamber 72 via the hole 71a as shown by an arrow A4. Then, the pressure in the chamber 72 is increased and the fuel gas is supplied into the power generating chamber 82 via the through holes 73a arranged in the second wall 73 as shown by arrows B4. Additionally, the fuel gas is also supplied into the power generating chamber 82 via the through holes 74a in the side walls 74 and through holes 75b in the current collection boards 75 as shown by arrows C4. The thus supplied fuel gas is mainly fed in a horizontal direction in the chamber 82 as shown by arrows G4 in FIG. 8.

After electric power is generated in the chamber 82, the depleted fuel gas is finally exhausted out through the space between the heat insulating wall 81 and the first wall 77 into the exhaust gas chamber 78 as shown by arrows E4. The depleted fuel gas is then mixed with the depleted oxidizing gas therein.

The preferred materials for the air electrodes 88, solid electrolytes 89, fuel electrodes 90 and the interconnector 86 are the same as those cited in the first embodiment.

The side walls 74 are made of a heat insulating metal or ceramic, which has resistance against the fuel gas and is stable at an operating temperature of the SOFC elements. Alloys such as Ni-Cr, Ni-Fe-Cr, Ni-Fe-Cr-Al, Co-Ni-Cr, Fe-Cr and Fe-Cr-Al can be cited, for instance, as such heat insulating metals.

According to the fourth embodiment, since the equipment is arranged such that the fuel gas is supplied not only from the second wall of the chamber 82 but also the side walls of so-called cell unit as shown in FIG. 8, fresh fuel gas can be constantly supplied to the entire surface of the SOFC element. Therefore, the fuel concentration gradient becomes small in the chamber 82 and substantially even, so that the temperature gradient along the longitudinal direction of the SOFC element 76 also becomes small. As a result, even when the equipment is operated for a long time, defects such as cracks are not apt to be generated in the SOFC element 76. Further, since the unevenness of the electrochemical reaction becomes small, it is possible to improve the power generating efficiency of the SOFC elements 76.

Moreover, in the conventional equipment shown in FIG. 1, the fuel gas chamber is arranged only under the second wall, and therefore, the side walls of the power generating chamber are surrounded by, for instance, air. Additionally, since the temperature of the air is low, it is necessary to give a heat insulation to the side wall 74. In other words, the side walls should be designed as a heat insulating walls. Therefore, the thickness of the side walls should be made large, for example, several tens of millimeters.

Contrary to this, in the fourth embodiment according to the present invention, in the fuel gas chamber 72 surrounding the power generating chamber 82 is filled with the fuel gas having a high temperature. Therefore, even if the thickness of the side walls 74 is small, it is possible to keep the temperature in the power generating chamber 82 at the operating temperature of SOFC element 76. As a result, it is possible to make the equipment compact.

In the fourth embodiment, the direction of the gas flow blown out from the side wall 74 is important. In the vertical directions in FIG. 8 (i.e., the in series connected direction of SOFC elements 76), belt-shaped interconnectors are arranged along the longitudinal direction of the element 76, and corresponding to this, the metal felts 79 are arranged between the SOFC elements to fill the space thereby. Therefore, the fuel gas could not pass through the portion well. On the other hand, the metal felts 84, by which the SOFC elements 76 are connected to each other in parallel, are not necessary to have belt-like shapes, but the metal felts 84 may be arranged to connect the elements at only one or two portions between the SOFC elements. Therefore, the fuel gas can pass through the wall in the vertical direction in FIG. 8 so that when the fuel gas is supplied into the chamber 82 in directions shown by arrows C4 in FIG. 8, the gas can be easily distributed over the power generating chamber 82.

In the fourth embodiment shown in FIG. 7, in order to make the fuel gas concentration more evenly distributed in the longitudinal direction of the SOFC element, the diameters and numbers of the through holes 74a and 75a formed in the side walls 74 and current correction boards 75 should be determined in a suitable manner.

FIG. 10 is a cross sectional view showing the construction according to the fifth embodiment of the present invention.

In the fifth embodiment, both the second wall 93 and a pair of side walls 94 are made of a porous material. Therefore, the fuel gas in the fuel gas chamber 72 is (having passed through hole 71a of can-like body 71, as shown by arrow A5) transmitted through the first wall 93 (arrows B5) and the side walls 94 (arrows C5) to be fed into the power generating chamber 82 by a differential pressure between the gas exhaust chamber 78 and the fuel gas chamber 72. The fuel gas transmitted through the side walls 75 further passes through the through holes 75a and then flows along with the surface of the fuel electrodes of the SOFC elements 76. Depleted fuel gas is exhausted in exhaust chamber 77 through holes 77a of first wall 77, as shown by arrows E5. The oxidizing gas is exhausted into exhaust chamber 78 as shown by arrows D5, in the fifth embodiment, it is possible to obtain the same effect as the fourth embodiment. Additionally, in the fifth embodiment, since the side walls as a whole are made of the porous material, it would be possible to distribute the fuel gas in the chamber 82 in a more even manner.

However, if the porosity of the side walls is evenly distributed, the gas concentration in the vicinity of the bottom side of the element 76 would becomes higher than that in the vicinity of the opening side of the element 76. Therefore, it is desired that the porosity of the side walls has a gradient so as to the transmitted gas amount in the upper side becomes larger than that in the bottom side.

Further, the first wall 93 and the side walls 94 should be stabilized against the high temperature fuel gas. Therefore, the porous metal made by sintering the reduction resistance metal powder or the porous cermet made by sintering the reduction resistance metal powder and ceramic powder, is preferred as the material thereof. The ceramic powder mainly consisting of alumina or zirconia is cited as the ceramic powder; and alloy powder such as Ni-Cr, Ni-Fe-Cr, Ni-Fe-Cr-Al, Co-Ni-Cr, Fe-Cr and Fe-Cr-Al or metal powder such as Ni, Co and Fe are cited as the reduction resistant metal powder.

It is preferred that the side wall 94 has its porosity of 10–90%, as same as the first to fourth embodiments. It is further preferred to make a gradient in the porosity of the side wall 94; and the gradient can be made in the same manner explained in the first embodiment. Additionally, fuel gas transmitting amount control, with the aid of slurry, can be conducted in the same manner as for the fuel gas supply tube in the first embodiment.

Each SOFC element is held in a vertical direction. However, it may be possible to hold the SOFC element in a horizontal direction.

In the fourth and fifth embodiments, since the fuel gas having a high temperature is supplied from outside of the side walls into the power generating chamber, it is not necessary to give a heat insulating function to the side walls. Therefore, even if the thickness of the side wall is thin, the temperature in the power generating chamber can be kept at an operational temperature of the SOFC elements. Thus it is possible to make the power generating equipment compact.

The present inventors conducted an experiment to measure the temperature gradients in the power generating chambers of the conventional equipment shown in FIG. 1 and the present equipment shown in FIG. 7 in the longitudinal direction of the SOFC elements provided therein. The measuring points a, b, c, d and e indicated in FIG. 7 were selected; and the distance between the respective measuring points is 100 mm. A gas containing 96% of hydrogen and 4% of steam is used as the fuel gas, and air is used as the oxidizing gas. The temperature of the SOFC element is measured with the aid of thermocouples. Further, a power output per one SOFC element of each equipment is also measured. The measurement result is shown in Table 3.

TABLE 3

|  | Temperature (°C.) | | | | | Output |
| --- | --- | --- | --- | --- | --- | --- |
|  | a | b | c | d | e | (W) |
| Conventional equipment (FIG. 1) | 1024 | 1020 | 978 | 901 | 833 | 6.6 |
| Fourth embodiment (FIG. 7) | 1037 | 1033 | 1001 | 972 | 964 | 8.1 |

As is clear from Table 3, since the power generating equipment according to the present invention is constructed such that the fuel gas is supplied into the power generating chamber in an even manner in a longitudinal direction of SOFC elements provided in the chamber, a fresh fuel gas can be constantly supplied to not only bottom side of the SOFC element but also to the upper opening side thereof. Therefore, the fuel gas concentration gradient in the power generating chamber becomes small and the concentration becomes even therein. Additionally the temperature gradient in the longitudinal direction of SOFC element in the chamber becomes small. As a result, even when the power generating equipment is operated for a long time, cracks are not apt to be generated in the SOFC elements. Moreover, an evenness of the electrochemical reaction becomes small, so that the power generating efficient of each SOFC element is improved.

What is claimed is:

1. A power generating device comprising:
   a plurality of cylindrical solid oxide fuel cell elements being electrically connected to each other to define a collecting cell;
   first and second current collecting means being connected to positive and negative electrodes of said collecting cell, respectively;
   a power generating chamber containing said collecting cell;
   an oxidizing gas chamber being separated from said power generating chamber by a first partition;
   a fuel gas chamber being separated from said power generating chamber by a second partition;
   an oxidizing gas supply means for supplying an oxidizing gas from said oxidizing gas chamber into an internal space of each of said solid oxide fuel cell elements through said first partition;
   fuel gas supply means for supplying a fuel gas from said fuel gas chamber to said power generating chamber through said second partition, said oxidizing gas being reacted with said fuel gas to generate electric power; and
   a fuel gas introducing means for introducing said fuel gas into said power generating chamber such that a fuel gas concentration in said power generating chamber is substantially constant along a longitudinal direction of said solid oxide fuel cell elements, said fuel gas introducing means comprising fuel gas supply tubes arranged between said solid oxide fuel cell elements in a first direction which is substantially perpendicular to a longitudinal direction of said solid oxide fuel cell elements.

2. The power generating device of claim 1, wherein each of said solid oxide fuel cell elements comprises a porous supporting tube and an air electrode, wherein a solid electrolyte and a fuel electrode are arranged sequentially around an outer surface of said porous supporting tube.

3. The power generating device of claim 2, wherein the air electrode of each of said solid oxide fuel cell elements is electrically connected in series to the fuel electrode of a solid oxide fuel cell element which is contiguously arranged along said first direction.

4. The power generating device of claim 3, further comprising an interconnector, a connecting terminal and a metal felt sequentially arranged between said aid electrode of each solid oxide fuel cell element and the fuel electrode of the contiguously arranged solid oxide fuel cell.

5. The power generating device of claim 4, wherein each of said interconnectors comprises doped or non-doped conductive perovskite oxide of $LaCrO_3$.

6. The power generating device of claim 2, wherein each of said air electrodes comprises doped or non-doped conductive perovskite oxide.

7. The power generating device of claim 6, wherein said perosvskite oxide comprises at least one material selected from the group consisting of $LaMnO_3$, $CaMnO_3$, $LaNiO_3$, $LaCoO_3$, and $LaCrO_3$.

8. The power generating device of claim 2, wherein each of said solid electrolytes comprises yttria stabilized zirconia or yttria partially stabilized zirconia.

9. The power generating device of claim 2, each of said fuel electrodes comprises nickel-zirconia cermet or cobalt-zirconia cermet.

10. The power generating device of claim 2, further comprising a metal felt arranged between adjacent solid oxide fuel cell elements along a second direction which is substantially perpendicular to said first direction, said solid oxide fuel cell elements being contiguously arranged in said second direction such that the solid oxide fuel cell elements are connected to each other in parallel via said metal felt.

11. The power generating device of claim 1, wherein each of said fuel gas supply tubes comprises a porous conductive material.

12. The power generating device of claim 1, wherein said porous conductive material is a porous metal formed by sintering a reduction resistance metal powder or is a porous cermet formed by sintering a mixture of a reduction resistance metal powder and a ceramic powder.

13. The power generating device of claim 11, wherein each of said fuel gas supply tubes is 10 to 90% porous.

14. The power generating device of claim 1, wherein each of said fuel gas supply tubes comprises a porous non-conductive material.

15. The power generating device of claim 14, wherein said porous non-conductive material is a ceramic.

16. The power generating device of claim 15, wherein said porous non-conductive ceramic comprises porous zirconia or porous alumina.

17. The power generating device of claim 1, wherein at least one fuel gas supply tube comprises heat insulating and reduction resistance material, said at least one fuel gas supply tube comprising a plurality of through holes provided in a wall thereof.

18. The power generating device of claim 17, wherein said heat insulating and reduction resistance material is a Nickel series or Co series metal.

19. The power generating device of claim 18, wherein Nickel series or Co series metal is one of Hastelloy metal and Inconel metal.

20. A power generating device comprising:
a plurality of cylindrical solid oxide fuel cell elements being electrically connected to each other to define a collecting cell;
first and second current collecting means being connected to positive and negative electrodes of said collecting cell, respectively;
a power generating chamber containing said collecting cell;
an oxidizing gas chamber being separated from said power generating chamber by a first partition;
a fuel gas chamber being separated from said power generating chamber by a second partition;
an oxidizing gas supply means for supplying an oxidizing gas from said oxidizing gas chamber into an internal space of each of said solid oxide fuel cell elements through said first partition;
fuel gas supply means for supplying a fuel gas from said fuel gas chamber to said power generating chamber through said second partition, said oxidizing gas being reacted with said fuel gas to generate electric power; and
a fuel gas introducing means for introducing said fuel gas into said power generating chamber such that a fuel gas concentration in said power generating chamber is substantially constant along a longitudinal direction of said solid oxide fuel cell elements, said fuel gas introducing means comprising a plurality of fuel gas supply tubes arranged to be substantially parallel of a longitudinal direction of said solid oxide fuel cell elements, at least one fuel gas supply tube having a first end for receiving fuel gas and a second end opposite said first end, wherein said at least one fuel gas supply tube has a porosity gradient such that porosity increases from said first end.

21. The power generating device of claim 20, wherein each of said solid oxide fuel cell elements comprises a porous supporting tube and an air electrode, and wherein a solid electrolyte and a fuel electrode are arranged sequentially around an outer surface of said porous supporting tube.

22. The power generating device of claim 21, wherein each of said air electrodes comprises doped or non-doped conductive perovskite oxide.

23. The power generating device of claim 22, wherein said perovskite oxide comprises at least one material selected from the group consisting of $LaMnO_3$, $CaMnO_3$, $LaNiO_3$, $LaCoO_3$, and $LaCrO_3$.

24. The power generating device of claim 21, wherein each of said solid electrolytes is comprised of yttria stabilized zirconia or yttria partially stabilized zirconia.

25. The power generating device of claim 21, wherein each of said fuel electrodes comprises nickel-zirconia cermet or cobalt-zirconia cermet.

26. The power generating device of claim 20, wherein the solid oxide fuel cell elements are electrically connected to each other in series.

27. The power generating device of claim 20, wherein the solid oxide fuel cell elements are electrically connected to each other in parallel.

28. The power generating device of claim 20, wherein each of said fuel gas supply tubes is comprised of a porous conductive material.

29. The power generating device of claim 28, wherein porous conductive material is a porous metal formed by sintering a reduction resistance metal powder or is a porous cermet formed by sintering a mixture of a reduction resistance metal powder and a ceramic powder.

30. The power generating device of claim 28, wherein each of said fuel gas supply tubes is 10 to 90% porous.

31. The power generating device of claim 20, wherein each of said fuel gas supply tubes is comprised of a porous non-conductive material.

32. The power generating device of claim 31, wherein said porous non-conductive material is a ceramic.

33. The power generating device of claim 32, wherein said porous non-conductive ceramic comprises porous zirconia or porous alumina.

34. The power generating device of claim 20, wherein at least one fuel gas supply tube comprises a plurality of spaced apart band-shaped pore-filled regions for restricting flow of fuel gas through said at least one fuel gas supply tube along a longitudinal direction thereof.

35. The power generating device of claim 34, wherein said band-shaped pore-filled regions are spaced apart from each other by a varying distance.

36. The power generating device of claim 20, wherein said at least one fuel gas supply tube is comprised of heat insulating and reduction resistance material, said at least one fuel gas supply tube having a plurality of through holes provided in a wall thereof.

37. The power generating device of claim 36, wherein said heat insulating and reduction resistance material is a Nickel series or Co series metal.

38. The power generating device of claim 37, wherein said Nickel series or Co series metal is one of Hastelloy metal and Inconel metal.

39. A power generating device comprising:
a plurality of cylindrical solid oxide fuel cell elements being electrically connected to each other to define a collecting cell;
first and second current collecting means being connected to positive and negative electrodes of said collecting cell, respectively;
a power generating chamber containing said collecting cell;
an oxidizing gas chamber being separated from said power generating chamber by a first partition;
a fuel gas chamber being separated from said power generating chamber by a second partition;
an oxidizing gas supply means for supplying an oxidizing gas from said oxidizing gas chamber into an internal space of each of said solid oxide fuel cell elements through said first partition;

fuel gas supply means for supplying a fuel gas from said fuel gas chamber to said power generating chamber through said second partition, said oxidizing gas being reacted with said fuel gas to generate electric power; and a fuel gas introducing means for introducing said fuel gas into said power generating chamber such that a fuel gas concentration in said power generating chamber is substantially constant along a longitudinal direction of said solid oxide fuel cell elements, said fuel gas introducing means comprising a plurality of fuel gas supply tubes arranged to be substantially parallel to a longitudinal direction of said solid oxide fuel cell elements, at least one of said fuel gas supply tubes being porous and comprising a plurality of band-shaped pore-filled regions for restricting flow of fuel gas through said at least one fuel gas supply tube along the longitudinal direction thereof.

40. The power generating device of claim 39, wherein band-shaped filled regions are spaced apart from each other by a varying distance.

41. The power generating equipment according to claim 39, wherein each of said solid oxide fuel cell elements comprises a porous supporting tube and an air electrode, and wherein a solid electrolyte and a fuel electrode are arranged sequentially around an outer surface of said porous supporting tube.

42. The power generating device of claim 41, wherein each of said solid electrolytes comprises yttria stabilized zirconia or yttria partially stabilized zirconia.

43. The power generating device of claim 41, wherein each of said electrodes comprises doped or non-doped conductive perovskite oxide.

44. The power generating device of claim 43, wherein said perovskite oxide comprises at least one material selected from the group consisting of $LaMnO_3$, $CaMnO_3$, $LaNiO_3$, $LaCoO_3$, and $LaCrO_3$.

45. The power generating device of claim 41, wherein each of said fuel electrodes comprises nickel-zirconia cermet or cobalt-zirconia cermet.

46. The power generating equipment according to claim 39, wherein the solid oxide fuel cell elements are electrically connected to each other in series.

47. The power generating device of claim 39, wherein the solid oxide fuel cell elements are electrically connected to each other in parallel.

48. The power generating device of claim 39, wherein each of said fuel gas supply tubes is made of a porous conductive material.

49. The power generating device of claim 48, wherein said porous conductive material is a porous metal formed by sintering a reduction resistance metal powder or is a porous cermet formed by sintering a mixture of a reduction resistance metal powder and a ceramic powder.

50. The power generating device of claim 48, wherein each of said fuel gas supply tubes is 10 to 90% porous.

51. The power generating device of claim 39, wherein at least one of the fuel gas supply tubes has a first end for receiving fuel gas and a second end opposite said first end, wherein said at least one of the fuel gas supply tubes has a porosity gradient such that porosity increases from said first end to said second end.

52. A power generating device comprising:

a plurality of cylindrical solid oxide fuel cell elements being electrically connected to each other to define a collecting cell;

first and second current collecting means being connected to positive and negative electrodes of said collecting cell, respectively;

a power generating chamber containing said collecting cell, said power generating chamber comprising a plurality of side walls extending substantially parallel to said solid oxide fuel cell elements, and a bottom wall extending substantially perpendicular to said solid oxide fuel cell elements and joining said side walls together;

an oxidizing gas chamber being separated from said power generating chamber by a partition;

an outer enclosure substantially completely surrounding the power generating chamber such that a fuel gas supply chamber is formed by a volume between the outer enclosure and the power generating chamber;

an oxidizing gas supply means for supplying an oxidizing gas from said oxidizing gas chamber into an internal space of each of said solid oxide fuel cell elements through said first partition; and fuel gas supply means for supplying a fuel gas from said fuel gas chamber through the side walls and bottom wall of the power generating chamber and into said power generating chamber, said oxidizing gas being reacted with said fuel gas to generate electric power.

53. The power generating device of claim 52, wherein said fuel gas supply means comprises a plurality of through holes provided in said side walls and bottom wall.

54. The power generating device of claim 52, wherein said fuel gas supply means is defined by said side walls and bottom wall being porous to allow fuel gas to pass therethrough.

55. The power generating device of claim 52, wherein each of said solid oxide fuel cell elements comprises a porous supporting tube and an air electrode, wherein a solid electrolyte and a fuel electrode are arranged sequentially around an outer surface of said porous supporting tube.

56. The power generating device of claim 55, wherein the air electrode of each of said solid oxide fuel cell elements is electrically connected in series to the fuel electrode of a solid oxide fuel cell element which is contiguously arranged along a first direction.

57. The power generating device of claim 56, further comprising an interconnector, a connecting terminal and a metal felt sequentially arranged between said air electrode of each solid oxide fuel cell element and the fuel electrode of the contiguously arranged solid oxide fuel cell.

58. The power generating device of claim 57, wherein said interconnector comprises doped or non-doped conductive perovskite oxide of $LaCrO_3$.

59. The power generating device of claim 55, further comprising a metal felt between adjacent solid oxide fuel cell elements along a second direction which is substantially perpendicular to said first direction.

60. The power generating device of claim 55, wherein said air electrode comprises doped or non-doped perovskite oxide.

61. The power generating device of claim 60, wherein said perovskite oxide is selected from the group consisting of $LaMnO_3$, $CaMnO_3$, $LaNiCO_3$, $LaCoO_3$, $LaCrO_3$.

62. The power generating device of claim 55, wherein said solid electrolyte comprises yttria stabilized zirconia or yttria partially stabilized zirconia.

63. The power generating device of claim 55, wherein said fuel electrode comprises nickel-zirconia cermet or cobalt-zirconia cermet.

64. The power generating device of claim 52, wherein the solid oxide fuel cell elements are connected to each other in series.

65. The power generating device of claim 52, wherein said first and second current collecting means comprise first and second current collecting boards, respectively, said first and second current collecting boards being arranged between said collecting cell and said side walls of power generating chamber and being parallel to said solid oxide fuel cell elements, said first and second current collecting boards comprising a plurality of through holes therein to allow flow of fuel gas therethrough.

66. The power generating device of claim 52, wherein said side walls and said bottom wall comprise a porous metal or porous cermet.

67. The power generating device of claim 66, wherein said porous cermet is selected from the group consisting of nickel-zirconia cermet and cobalt-zirconia cermet.

68. The power generating device of claim 66, wherein said side walls and said bottom wall are 10 to 90% porous.

69. A power generating device comprising:
a plurality of cylindrical solid oxide fuel cell elements being electrically connected to each other to define a collecting cell;
first and second current collecting means being connected to positive and negative electrodes of said collecting cell, respectively;
a power generating chamber containing said collecting cell;
an oxidizing gas chamber being separated from said power generating chamber by a first partition;
a fuel gas chamber being separated from said power generating chamber by a second partition;
an oxidizing gas supply means for supplying an oxidizing gas from said oxidizing gas chamber into an internal space of each of said solid oxide fuel cell elements through said first partition;
fuel gas supply means for supplying a fuel gas from said fuel gas chamber to said power generating chamber through said second partition, said oxidizing gas being reacted with said fuel gas to generate electric power; and
a fuel gas introducing means for introducing said fuel gas into said power generating chamber such that a fuel gas concentration in said power generating chamber is substantially constant along a longitudinal direction of said solid oxide fuel cell elements, said fuel gas introducing means comprising a plurality of fuel gas supply tubes arranged to be substantially parallel to a longitudinal direction of said solid oxide fuel cell elements, each of said fuel gas supply tubes being comprised of porous non-conductive material and having a plurality of band-shaped pore-filled regions for restricting flow of fuel gas through said at least one fuel gas supply tube along the longitudinal direction thereof.

70. The power generating device of claim 69, wherein band-shaped filled regions are spaced apart from each other by a varying distance.

71. The power generating equipment according to claim 69, wherein each of said solid oxide fuel cell elements comprises a porous supporting tube and an air electrode, and wherein a solid electrolyte and a fuel electrode are arranged sequentially around an outer surface of said porous supporting tube.

72. The power generating device of claim 71, wherein each of said electrodes comprises doped or non-doped conductive perovskite oxide.

73. The power generating device of claim 72, wherein said perovskite oxide comprises at least one material selected from the group consisting of $LaMnO_3$, $CaMnO_3$, $LaCoO_3$, and $LaCrO_3$.

74. The power generating device of claim 71, wherein each of said solid electrolytes comprises yttria stabilized zirconia or yttria partially stabilized zirconia.

75. The power generating device of claim 71, wherein each of said fuel electrodes comprises nickel-ziconia cermet or cobalt-zirconia cermet.

76. The power generating equipment according to claim 69, wherein the solid oxide fuel cell elements are electrically connected to each other in series.

77. The power generating device of claim 69, wherein the solid oxide fuel cell elements are electrically connected to each other in parallel.

78. The power generating device of claim 69, wherein said porous non-conductive material is a porous non-conductive ceramic.

79. The power generating device of claim 78, wherein said porous non-conductive ceramic comprises porous zirconia or porous alumina.

80. The power generating device of claim 69, wherein each of said fuel gas supply tubes is 10 to 90% porous.

81. The power generating device of claim 69, wherein at least one of the fuel gas supply tubes has a first end for receiving fuel gas and a second end opposite said first end, wherein said at least one of the fuel gas supply tubes has a porosity gradient such that porosity increases from said first end to said second end.

82. A power generating device comprising:
a plurality of cylindrical solid oxide fuel cell elements being electrically connected to each other to define a collecting cell;
first and second current collecting means being connected to positive and negative electrodes of said collecting cell, respectively;
a power generating chamber containing said collecting cell;
an oxidizing gas chamber being separated from said power generating chamber by a first partition;
a fuel gas chamber being separated from said power generating chamber by a second partition;
an oxidizing gas supply means for supplying an oxidizing gas from said oxidizing gas chamber into an internal space of each of said solid oxide fuel cell elements through said first partition;
fuel gas supply means for supplying a fuel gas from said fuel gas chamber to said power generating chamber through said second partition, said oxidizing gas being reacted with said fuel gas to generate electric power; and
a fuel gas introducing means for introducing said fuel gas into said power generating chamber such that a fuel gas concentration in said power generating chamber is substantially constant along a longitudinal direction of said solid oxide fuel cell elements, said fuel gas introducing means comprising a plurality of fuel gas supply tubes arranged to be substantially parallel to a longitudinal direction of said solid oxide fuel cell elements, at least one of said fuel gas supply tubes being porous and comprising a plurality of through holes in a wall thereof and a plurality of band-shaped pore-filled regions for restricting flow of fuel gas through said at least one fuel gas supply tube along the longitudinal direction thereof.

83. The power generating device of claim 82, wherein said at least one fuel gas supply tube is comprised of heat insulating and reduction resistance material.

84. The power generating device of claim 83, wherein said heat insulating and reduction resistance material is a Nickel series or Co series metal.

85. The power generating device of claim 84, wherein said Nickel series or Co series metal is one of Hastelloy metal and Inconel metal.

86. The power generating device of claim 68, wherein said side walls and said bottom wall further comprise pore-filled regions along one of opposite major surfaces of the side walls and bottom wall.

87. The power generating device of claim 86, wherein the pore-filled regions are spaced apart from each other by a varying distance.

* * * * *